United States Patent
Cheng et al.

(10) Patent No.: US 12,526,851 B2
(45) Date of Patent: Jan. 13, 2026

(54) ASSISTED CONNECTIVITY

(71) Applicant: QUALCOMM Incorporated, San Diego, CA (US)

(72) Inventors: Peng Cheng, Beijing (CN); Gavin Bernard Horn, La Jolla, CA (US); Karthika Paladugu, Hyderabad (IN); Hong Cheng, Basking Ridge, NJ (US); Qing Li, Princeton Junction, NJ (US); Ozcan Ozturk, San Diego, CA (US); Soo Bum Lee, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/023,997

(22) PCT Filed: Oct. 13, 2020

(86) PCT No.: PCT/CN2020/120572
§ 371 (c)(1),
(2) Date: Feb. 28, 2023

(87) PCT Pub. No.: WO2022/077207
PCT Pub. Date: Apr. 21, 2022

(65) Prior Publication Data
US 2023/0276510 A1     Aug. 31, 2023

(51) Int. Cl.
*H04W 76/10* (2018.01)
*H04W 48/16* (2009.01)
(Continued)

(52) U.S. Cl.
CPC .......... *H04W 76/10* (2018.02); *H04W 48/16* (2013.01); *H04W 48/20* (2013.01); *H04W 92/18* (2013.01)

(58) Field of Classification Search
None
See application file for complete search history.

(56) References Cited

U.S. PATENT DOCUMENTS 10,624,006 B2   4/2020   Hampel et al.
2018/0041898 A1*   2/2018   Hampel .............. H04W 12/062
(Continued)

FOREIGN PATENT DOCUMENTS

| CN | 111432469 A | 7/2020 |
|---|---|---|
| WO | 2017176329 A1 | 10/2017 |
| WO | 2018026542 A1 | 2/2018 |

OTHER PUBLICATIONS

Philips International B V: "UE-To-Network Relay Discovery and Handling of PDU Session Parameters with Remote UE Based Relay Selection", 3GPP Draft, SA WG2 Meeting #139e, S2-2004202, 3rd Generation Partnership Project, Mobile Competence Centre, 650, Route Des Lucioles, F-06921 Sophia-Antipolis Cedex, France, vol. SA HG2, No. Elbonia, Jun. 1, 2020-Jun. 12, 2020, May 22, 2020, XP051890206, 7 pages, p. 5-p. 6.
(Continued)

*Primary Examiner* — Hong S Cho
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for assisted connectivity techniques. For example, a UE may transmit, to an AN, a request to establish a RRC connection with a PN, and the AN may further transmit, to the PN, the request received from the UE to establish the RRC connection with the PN. After receiving the request, the PN may transmit, to the AN, one or more RRC connection parameters for the RRC connection with the UE, and the AN may further transmit, to the UE, the one or more connection parameters received from the PN for establishing
(Continued)

the RRC connection with the PN. Based on the one or more parameters received from the AN, the UE may establish the RRC connection with the PN.

26 Claims, 14 Drawing Sheets

(51) Int. Cl.
*H04W 48/20* (2009.01)
*H04W 92/18* (2009.01)

(56) References Cited

U.S. PATENT DOCUMENTS

| | | | |
|---|---|---|---|
| 2018/0295481 A1* | 10/2018 | Kahtava | ............... H04W 4/70 |
| 2019/0373661 A1 | 12/2019 | Kousaridas et al. | |
| 2020/0178343 A1 | 6/2020 | Kim et al. | |
| 2020/0322774 A1 | 10/2020 | Vargas et al. | |
| 2020/0322939 A1 | 10/2020 | Cao et al. | |
| 2021/0045093 A1* | 2/2021 | Rao | ............... H04W 76/14 |

OTHER PUBLICATIONS

Supplementary European Search Report—EP20956989—Search Authority—Berlin—May 15, 2024.
International Search Report and Written Opinion—PCT/CN2020/120572—ISA/EPO—Jun. 24, 2021.
OPPO: "TR 38.836 v0.1.0", 3GPP TSG-RAN WG2 #111-e, R2-2008274, 3rd Generation Partnership Project, Technical Specification Group Radio Access Network, Study on NR Sidelink Relay, (Release 17), 3GPP TR 38.836 V0.1.0 (Sep. 2020), Sep. 2020, 16 Pages, section 4.5.5.1, The Whole Document.

* cited by examiner

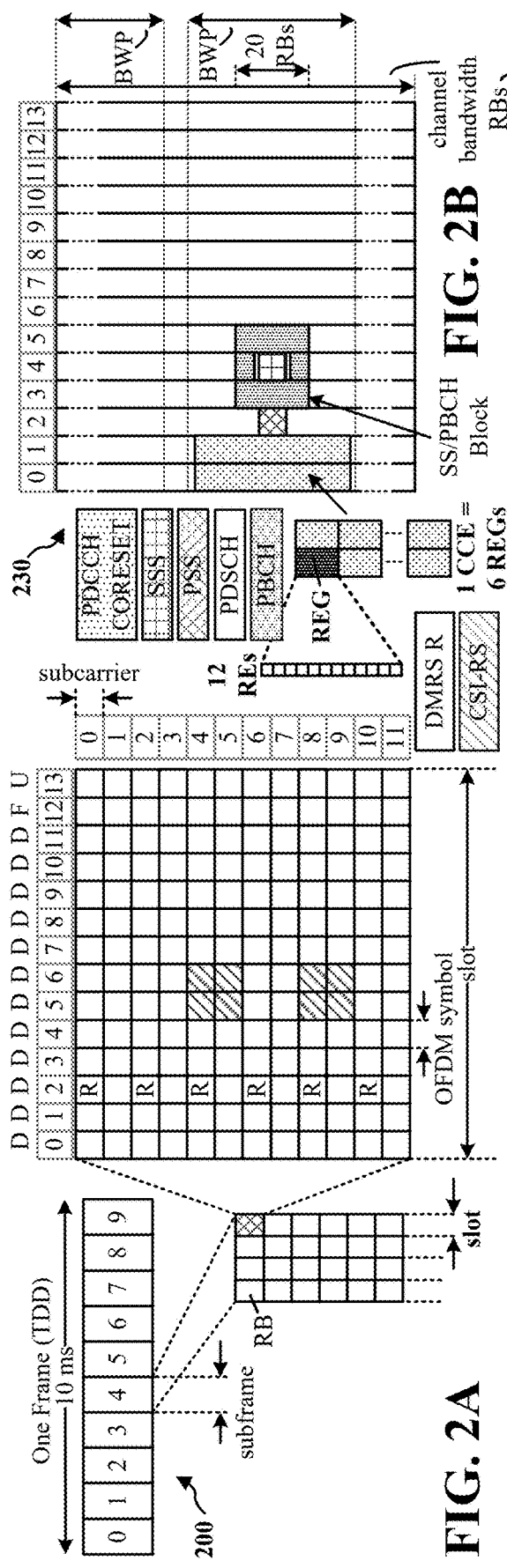
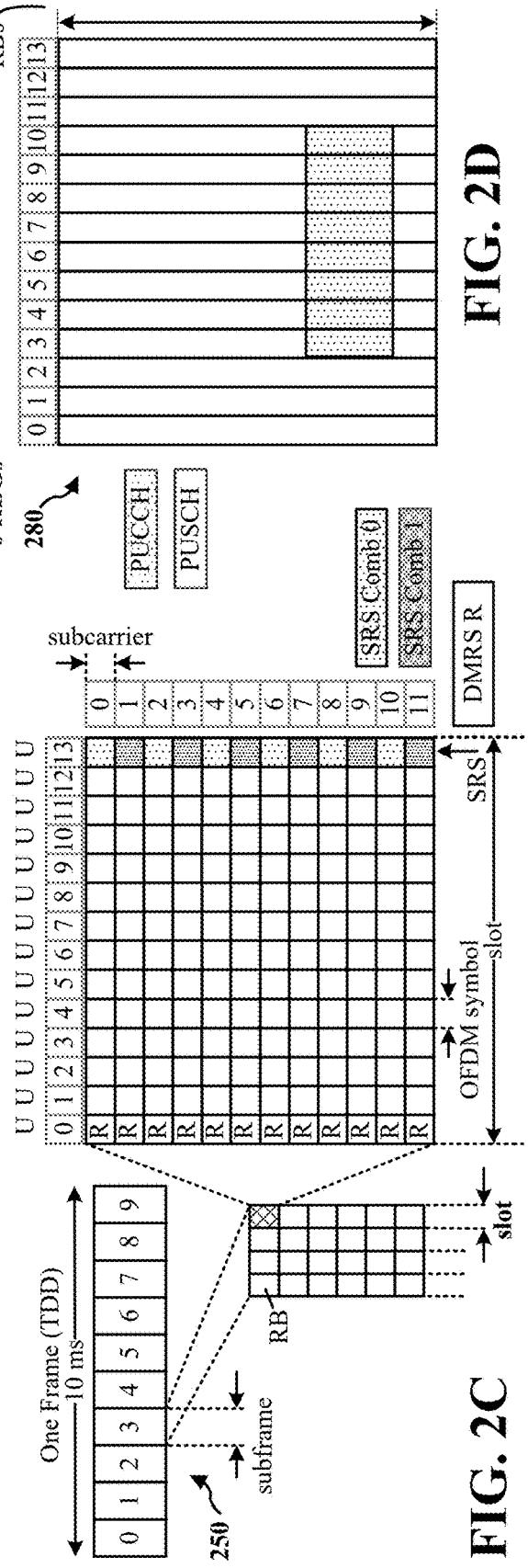
FIG. 2A  FIG. 2B  FIG. 2C  FIG. 2D

ASSISTED CONNECTIVITY

CROSS REFERENCE TO RELATED APPLICATION(S)

This application is a National Stage Application filed under 35 U.S.C. § 371 of PCT International Application No. PCT/CN2020/120572, entitled "ASSISTED CONNECTIVITY" and filed Oct. 13, 2020, which is expressly incorporated by reference herein in its entirety.

BACKGROUND

Technical Field

The present disclosure relates generally to communication systems, and more particularly, to assisted connectivity techniques.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) configured to transmit, to an assistant node (AN), a request to establish a radio resource control (RRC) connection with a primary node (PN); receive, from the AN, one or more RRC connection parameters for the RRC connection with the PN; and establish the RRC connection with the PN based on the one or more RRC connection parameters.

In an aspect of the disclosure, a method, a computer-readable medium, and an apparatus are provided. The apparatus may be a PN configured to receive, from an AN, a request to establish a RRC connection with a UE; transmit, to the AN, one or more RRC connection parameters for the RRC connection with the UE; and establish the RRC connection with the UE based on the one or more RRC connection parameters.

In an aspect of the disclosure, a method, a computer-readable medium, and an apparatus are provided. The apparatus may be an AN configured to receive, from a UE, a request to establish a RRC connection with a PN; transmit the request to establish the RRC connection to the PN; and receive, from the PN, one or more RRC connection parameters for the RRC connection, the RRC connection being established between the UE and the PN based on the RRC connection parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
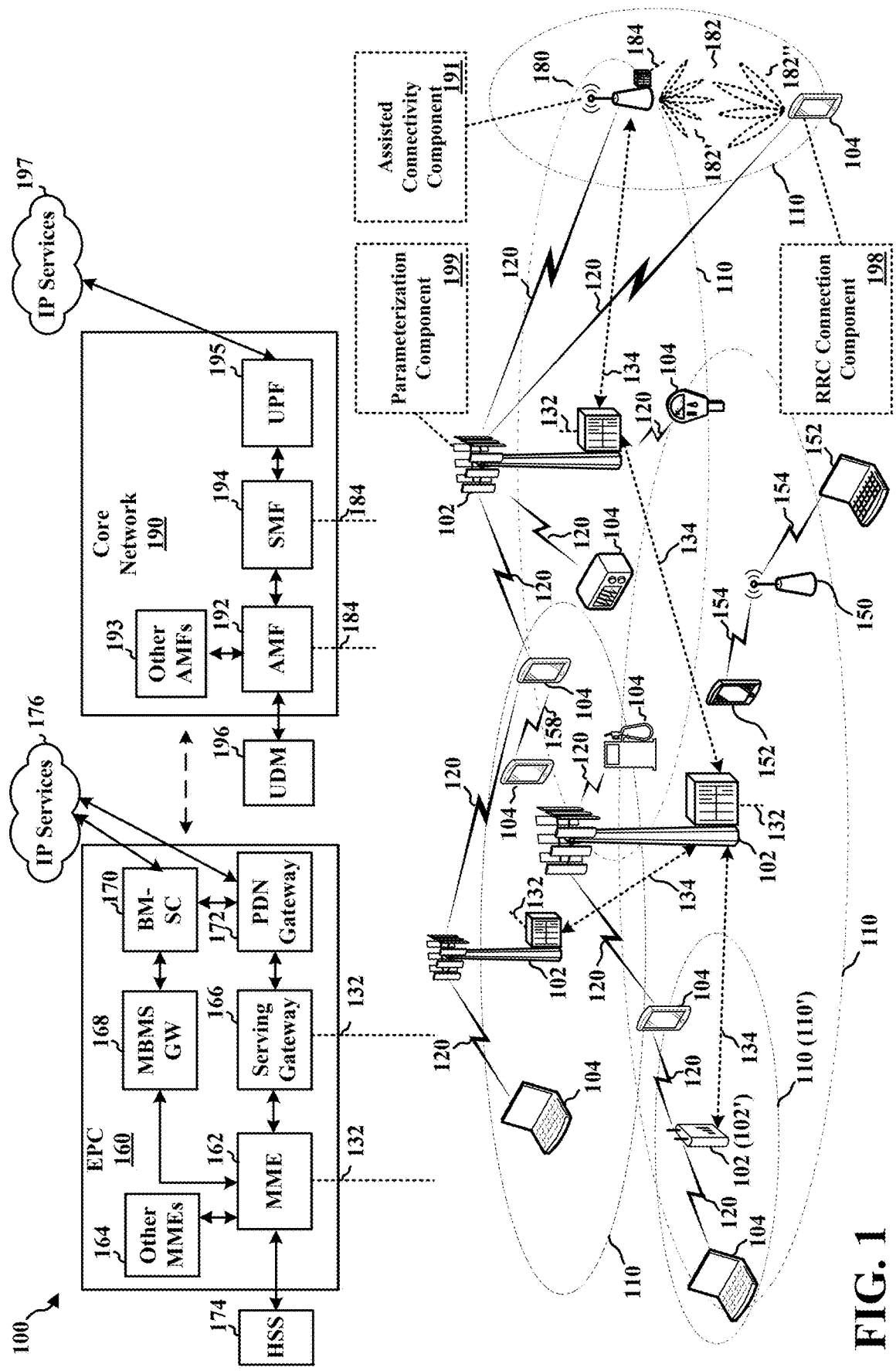
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a radio resource control (RRC) connection component 198 configured to transmit, to an assistant node (AN), a request to establish a RRC connection with a primary node (PN); receive, from the AN, one or more RRC connection parameters for the RRC connection with the PN; and establish the RRC connection with the PN based on the one or more RRC connection parameters. In certain aspects, the base station 102 may be a PN that includes a parameterization component 199 configured to receive, from an AN, a request to establish a RRC connection with a UE; transmit, to the AN, one or more RRC connection parameters for the RRC connection with the UE; and establish the RRC connection with the UE based on the one or more RRC connection parameters. In certain aspects, the base station 180 may be an AN that includes an assisted connectivity component 191 configured to receive, from a UE, a request to establish a RRC connection with a PN; transmit the request to establish the RRC connection to the PN; and receive, from the PN, one or more RRC connection parameters for the RRC connection, the RRC connection being established between the UE and the PN based on the RRC connection parameters. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
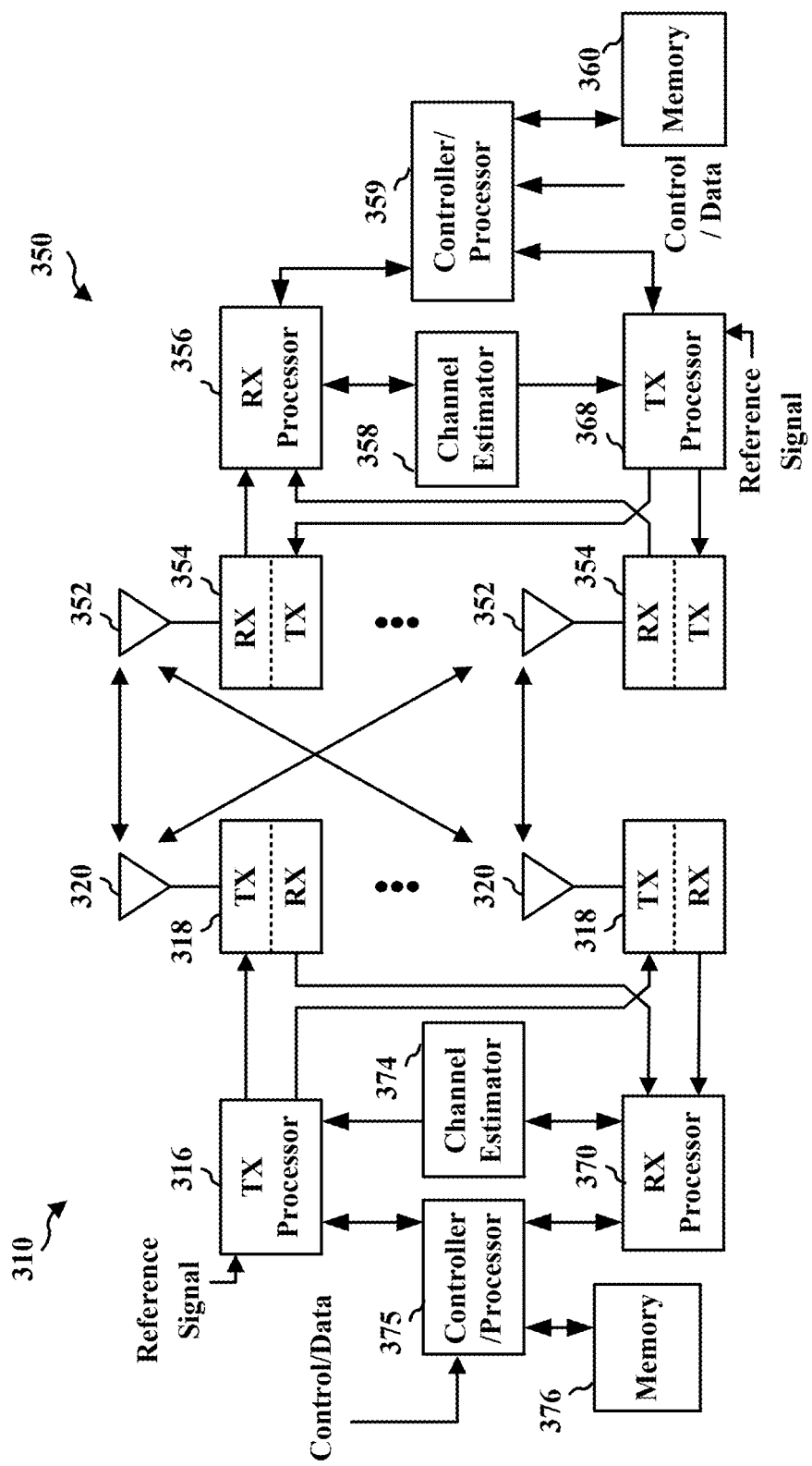
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

At least one of the TX processor 316, the RX processor 370, and the controller/processor 375 may be configured to perform aspects in connection with 191 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
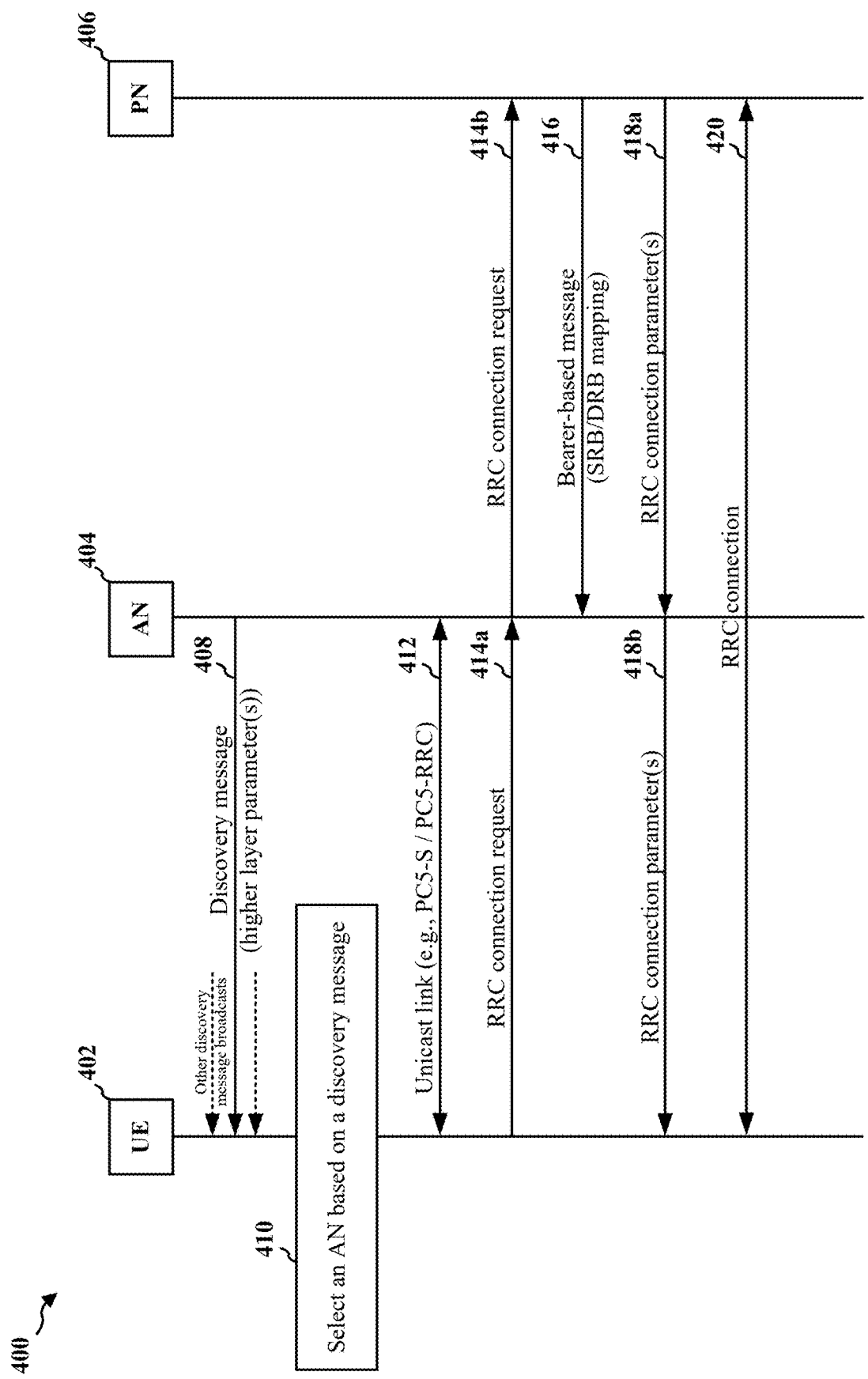
FIG. 4 is a call flow diagram illustrating communications between a UE and a base station.

FIG. 4 is a call flow diagram 400 illustrating communications between a UE 402, an AN 404, and a PN 406. At 408, the AN 404 may broadcast a discovery message indicative of one or more higher layer parameter(s). The UE 402 may be configured to discover the AN 404 based on the discovery message broadcast, at 408, which may be received by the UE 402 among a plurality of other discovery message broadcasts. At 410, the UE 402 may select the AN 404 for assisted connectivity with the PN 406 based on the discovery message received, at 408.

At 412, the UE 402 and the PN 404 may establish a unicast link. In configurations, the unicast link may be based on a PC5-S connection or a PC5-RRC connection. At 414*a*, to request establishment of a RRC connection with the PN 406, the UE 402 may transmit a RRC connection request to the AN 404. The AN 404 may transmit/relay, at 414*b*, the RRC connection request from the UE 402 to the PN 406.

At 416, the PN 406 may transmit a bearer-based message to the AN 404. The bearer-based message may be indicative of a signaling radio bearer/dedicated radio bearer (SRB/DRB) mapping between the UE 402 and the PN 406. The PN 406 may subsequently transmit, at 418*a*, RRC connection parameter(s) to the AN 404 for establishing the RRC connection between the UE 402 and the PN 406. At 418*b*, the AN 404 may transmit/relay the RRC connection parameter(s) from the PN 406 to the UE 402. At 420, the UE 402 and the PN 406 may establish the RRC connection based on the RRC connection parameter(s).

Figure 5:
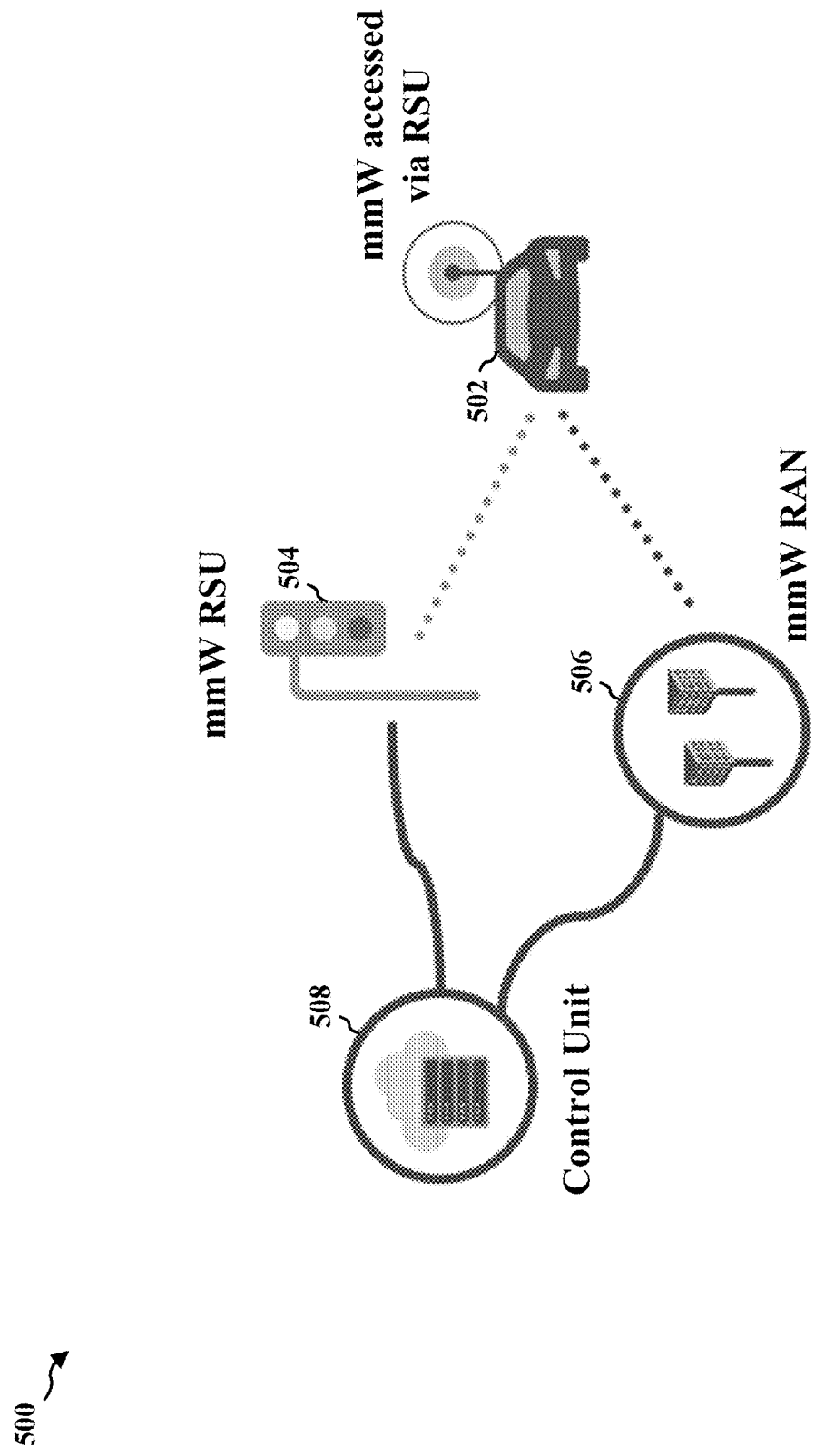
FIG. 5 is a diagram for providing millimeter wave (mmW) communications to a UE/vehicle via a roadside unit (RSU).

FIG. 5 illustrates a diagram 500 for providing millimeter wave (mmW) communications to a UE/vehicle 502 via a roadside unit (RSU) 504. The RSU 504 may utilize a PC5 link to enable non-standalone mmW communications without a network anchor. In examples, a network anchor such as a radio access network (RAN) 506 that operates in the mmW spectrum may be configured to communicate with the UE/vehicle 502. However, the control plane (C-plane) and the user plane (U-plane) may also be provided to the UE/vehicle 502 via the PC5 link. The RSU 504 may relay mmW control signaling from a control unit 508 to the UE/vehicle 502 based on a robustness of the PC5 link. For example, the RSU 504 may additionally be configured to operate in a sub-6 GHz spectrum. Thus, the PC5 link between the UE/vehicle 502 and the RSU 504 may be more robust than a Uu link between the UE/vehicle 502 and the RAN 506. Accordingly, the RSU 504 may serve as an anchor node for the mmW communications over the PC5 link and provide a reliable C-plane to manage the connection as well as a fallback to the U-plane to reduce signal interruptions. After a connection is established, the UE/vehicle 502 may utilize the RAN 506 for a higher data throughput. Such configurations may be enabled transparently to the RSU 504.

Figure 6:
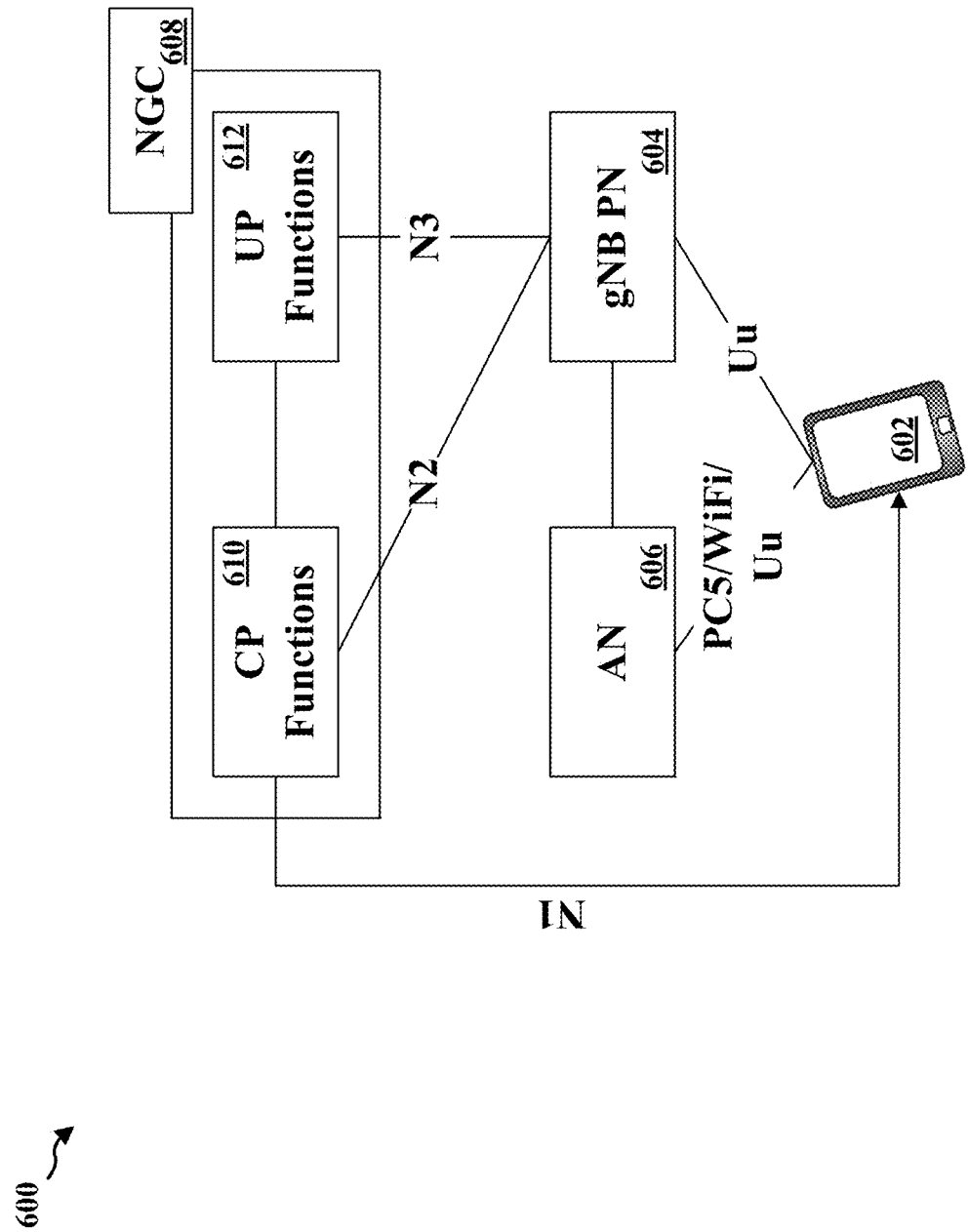
FIG. 6 is a diagram of an example network architecture for assisted connectivity.

FIG. 6 illustrates a diagram 600 of an example network architecture. For RSU assisted connectivity, a UE 602 may establish a Uu RRC connection with a node, such as a gNB PN 604, to increase a reliability associated with a C-plane link connection (e.g., N1). The UE 602 may establish the connection with the PN 604 via an AN 606 using the same or different radio access technology (RAT). For example, the AN 606 may be a RSU and the Uu RRC connection with the PN 604 may be established in mmW via the RSU. In a second example, the AN 606 may be a WiFi access point (AP) and the Uu RRC connection with the PN 604 may be established in mmW via the WiFi AP. In a third example, the AN 606 may be another base station and the Uu RRC connection with the PN 604 may be established in mmW via the other base station. The other base station may operate in a same or different frequency range from the PN 604.

In configurations, the PN 604 may operate in the sub-6 GHz spectrum, frequency range 2 (FR2) (e.g., mmW spectrum), or a THz frequency spectrum. When the UE 602 fails to establish the RRC connection directly with the PN 604, the UE 602 may transmit a request to establish the RRC connection with the PN 604 (e.g., operating in the mmW spectrum) via the AN 606, which may be connected to the UE 602 through a PC5 link (e.g., if the AN 606 is a RSU). The UE 602 may receive the RRC connection parameters from the PN 604 via the AN 606 and establish the RRC connection with the PN 604. The PN 604 may connect to a core network (e.g., via link N2 for C-plane functions 610 and/or link N3 for U-plane functions 612) to manage the RRC connection of the UE 602 via the core network. In examples, the core network may be a next generation core (NGC) 608.

Control bearers/signaling associated with an RSU may be provided over the PC5 link (e.g., in the sub-6 GHz spectrum) for increased robustness, such that a separate mmW link may be independently managed by the RSU. Data bearers associated with the PN 604 may be provided directly over the Uu link in the mmW spectrum for increased throughput. Communication with a mmW control unit may be transparent to the RSU (e.g., based on an encapsulated message). The network interface between the AN 606 and the PN 604 (e.g., between the RSU and the base station) may be collocated via a standardized interface or a non-standardized interface. For RRC establishment, a difference between the standardized interface and the non-standardized interface may be whether standardized/internal signaling is performed between the AN 606 and the PN 604 or whether the signaling is skipped for determining information to be shared between the AN 606 and the PN 604 (e.g., the RSU and the base station). In examples, the standardized interface may correspond to an IP tunnel (e.g., X2/Xn) or any other network interface associated with an IP.

Figure 7:
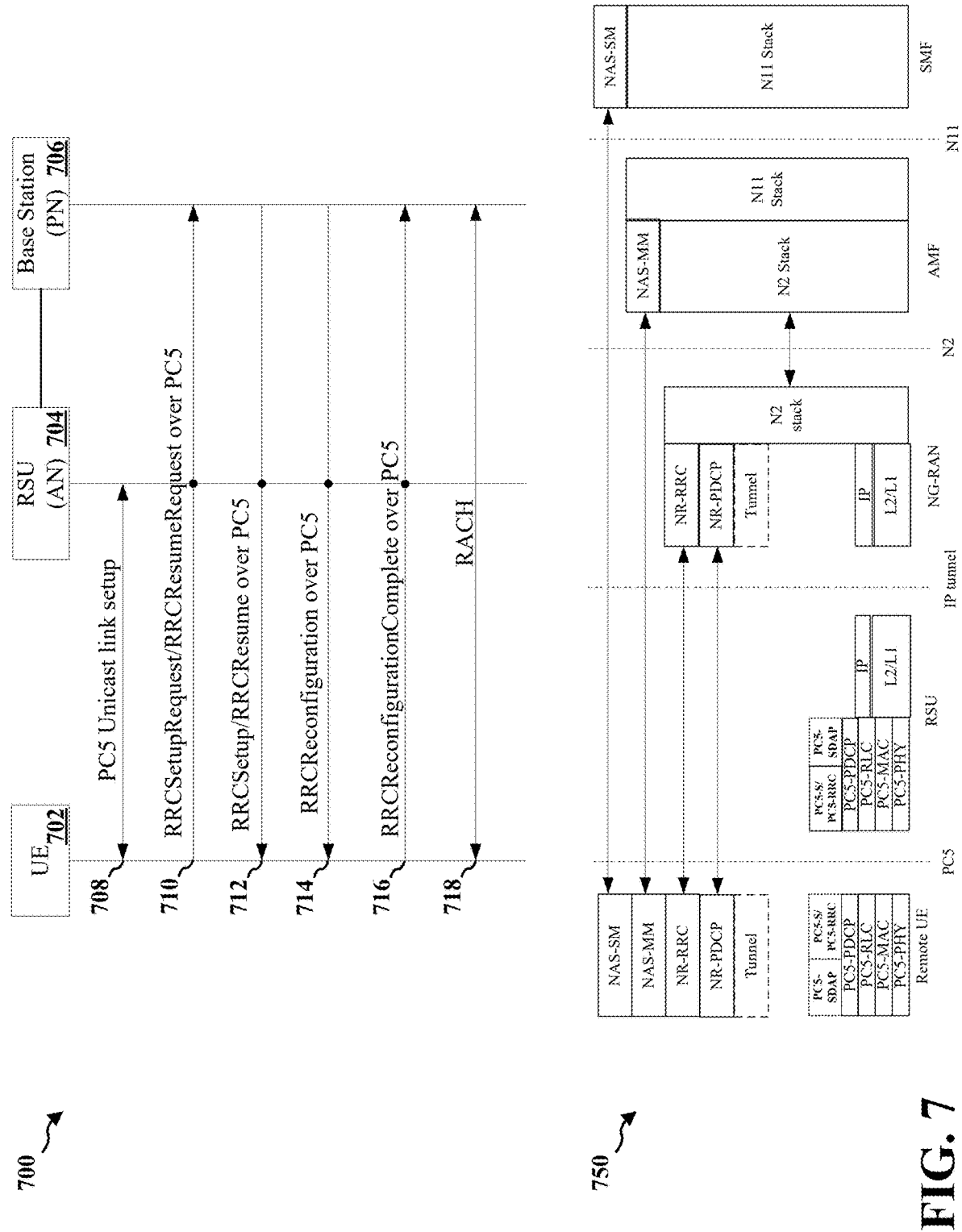
FIG. 7 illustrates a call flow diagram of communications between a UE, an assistant node (AN), and a primary node (PN), and a corresponding control plane (C-plane) protocol stack.

FIG. 7 includes a call flow diagram 700 illustrating communications between a UE 702, a RSU/AN 704, and a base station/PN 706, and a corresponding diagram 750 of a C-plane protocol stack. At 708, the UE 702 and the RSU/AN 704 may perform a PC5 unicast link setup procedure. Based on a channel in the PC5 link for transmitting a Uu RRC connection message, the UE 702 may request to establish a RRC connection with the base station/PN 706 via the RSU/AN 704. At 710, the UE 702 may transmit a RRCSetupRequest message from an idle state or a RRCResumeRequest message from inactive state to the RSU/AN 704 through dedicated signaling over the PC5 link, which may be further transmitted to the base station/PN 706. The Uu RRC connection message/signaling may be encapsulated in a corresponding PC5-S or PC5-RRC message to provide a transparent exchange from the UE 702 to the base station/PN 706 via the RSU/AN 704. In examples, the UE 702 may select the RSU/AN 704. For instance, the RSU may broadcast a discovery message that is received by the UE 702 to select the RSU based on higher layer criteria (e.g., a PC5 reference signal receive power (RSRP) measurement). After selecting the RSU/AN 704, the UE 702 may establish a PC5-RRC connection with the RSU/AN 704.

At 712, the base station/PN 706 may transmit a RRCSetup message or a RRCResume message to the RSU/AN 704 over the PC5 link, which may be further transmitted to the UE 704, in response to the RRCSetupRequest message or the RRCResume Request message received, at 710. At 714, the base station/PN 706 may transmit a RRCReconfiguration message over the PC5 link to the UE 702 (e.g., via the RSU/AN 704) to reconfigure one or more parameters of the UE 702. At 716, the UE 702 may indicate a completion of the RRC reconfiguration based on an RRCReconfigurationComplete message transmitted to the base station/PN 706 over the PC5 via the RSU/AN 704. At 718, the UE 702 and the base station/PN 706 may perform a RACH procedure for data transmissions between the UE 702 and the base station/PN 706. An increased throughput for the data may be provided after the UE 702 establishes the RRC connection with the base station/PN 706.

The diagram 750 is a corresponding C-plane protocol stack for the call flow diagram 700. The diagram 750 may be associated with an IP tunnel, as messages may be transmitted transparently from the UE 702 to the base station/PN 706. In examples, an IP or an Ethernet may be utilized to carry packet data convergence protocol (PDCP) traffic. Thus, the tunnel may be provided between a NR-PDCP and a PC5-PDCP.

Figure 8:
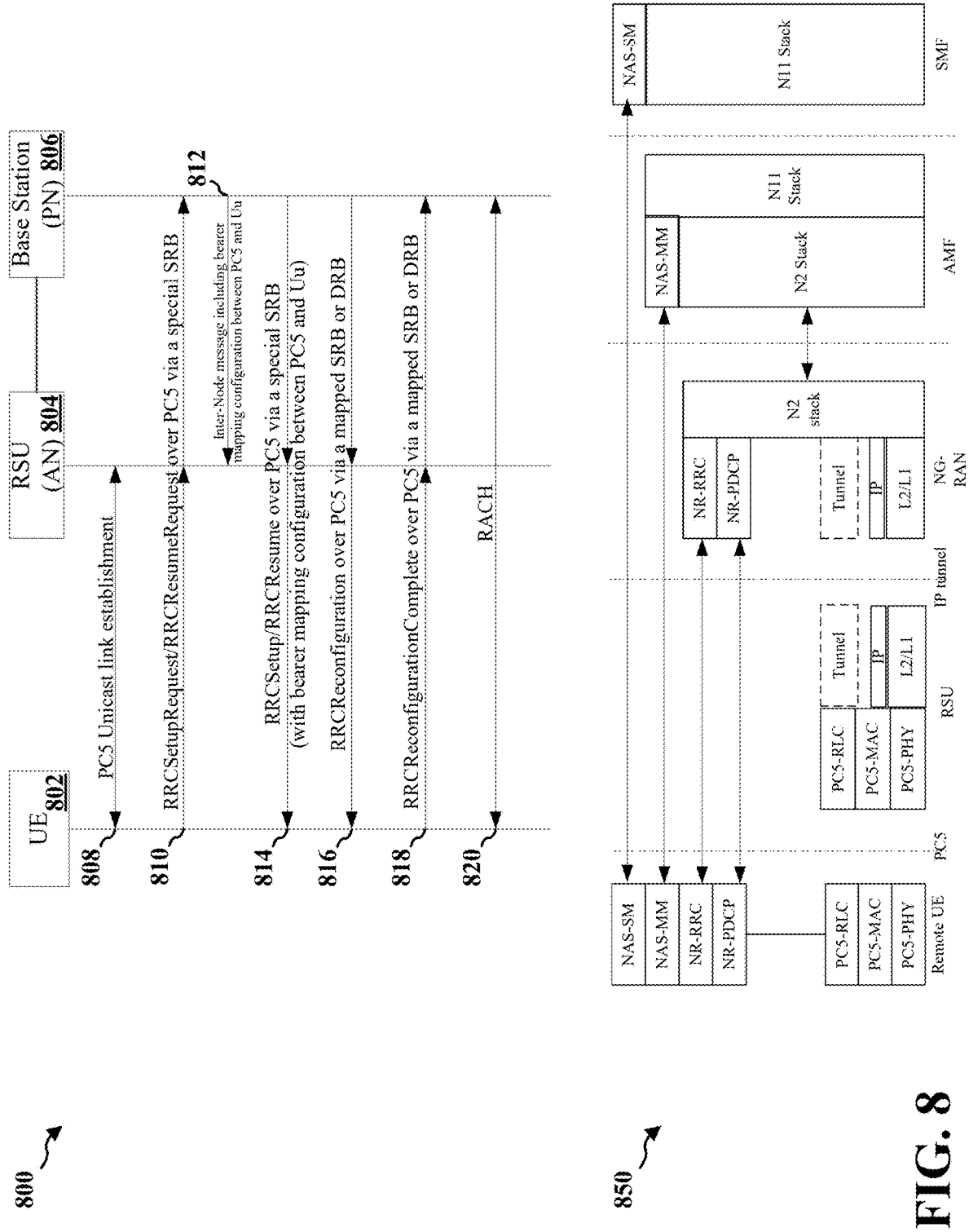
FIG. 8 illustrates a call flow diagram of communications between a UE, an AN, and a PN, and a corresponding C-plane protocol stack.

FIG. 8 includes a call flow diagram 800 illustrating communications between a UE 802, a RSU/AN 804, and a base station/PN 806, and a corresponding diagram 850 of a C-plane protocol stack. At 808, the UE 802 and the RSU/AN 804 may establish a PC5 (e.g., PC5-RRC) unicast link based on a PC5 unicast link establishment/setup procedure. At 810, the UE 802 may transmit a RRCSetupRequest message or a RRCResumeRequest message to the RSU/AN 804 over the PC5 link, which may be further transmitted to the base station/PN 806. A predetermined signaling radio bearer (SRB) or dedicated radio bearer (DRB) may be utilized for the UE 802 to transmit the RRCSetupRequest message or the RRCResume Request message to the RSU/AN 804. Resources for the predetermined SRB or DRB may be pre-configured resources or fixed resources based on a protocol. Thus, a reserved resource may be available to the UE 802 to transmit the RRC establishment request.

At 812, an inter-node message including a bearer mapping configuration between the PC5 link and the Uu link may be transmitted from the base station/PN 806 to the RSU/AN 804. The bearer mapping configuration between the PC5 link and the Uu link may be included in the RRCSetup message or the RRCResume message transmitted, at 814, to the UE 802 via the RSU/AN 804 in response to the RRC-SetupRequest message or the RRCResumeRequest message. The RRCSetup message and the RRCResume message may be transmitted to the UE 802 over the PC5 link based on the predetermined SRB or DRB. At 816, the base station/PN 806 may further transmit a RRCReconfiguration message to the UE 802 via the RSU/AN 804 over the PC5 link that is mapped to the SRB or DRB included in the RRCSetup message or the RRCResume message. At 818, the UE 802 may transmit a RRCReconfigurationComplete message to the base station/PN 806 over the PC5 link via the RSU/AN 804 based on the mapped SRB or DRB. At 820, the UE 802 and the base station/PN 806 may perform a RACH procedure for data transmissions between the UE 802 and the base station/PN 806. An increased throughput for the data may be provided after the UE 802 establishes the RRC connection with the base station/PN 806. The base station/PN 806 may perform the RACH procedure with the UE 802 after a reception of the RRCReconfigurationComplete message from the UE 802 or in parallel with reception of the RRCReconfigurationComplete message from the UE 802.

The diagram 850 is a corresponding C-plane protocol stack for the call flow diagram 800. That is, the diagram 850 may be associated with a configured mapping between the PC5 bearers corresponding to the RSU/AN 804 and the Uu bearers corresponding to the base station/PN 806 for forwarding a Uu RRC connection message. After the RSU/AN 804 receives a message via the SRB or DRB, the RSU/AN 804 may map the message to a Uu resource prior to forwarding the message to the base station/PN 806.

For termination of Uu bearers at the base station/PN 806, a message security may be based on the Uu PDCP. For termination of PC5 bearers, where data may be transmitted through the RSU/AN 804, the message security may be based on dual connectivity or PC5-RRC security. For example, the base station/PN 806 may derive an AN key (e.g., K_AN) from a PN key (e.g., K_PN) and transmit the derived AN key to the RSU/AN 804 as an inter-node message. Authentication and key establishment over the PC5 link or based on a direct security mode command (SMC) may not be utilized for algorithm selection and key confirmation. An AN counter, selected algorithms, user plane (UP) integrity protection, and an encryption indication for PC5 security may be provided to the UE 802 by the base station/PN 806 via RRC (e.g., the RRCReconfiguration message). The AN counter may be used by the UE 802 to derive the AN key (e.g., K_AN). The algorithms may be selected by the RSU/AN 804 and transmitted to the base station/PN 806, or the algorithms may be selected by the base station/PN 806, assuming the base station/PN 806 may determine the algorithms supported by the RSU/AN 804. PC5 link security setup may be based on the AN key (e.g., K_AN), which may be derived by the UE 802 for signaling (e.g., PC5-S/PC5-RRC) and PC5 bearer. Further, since a PN link may be similar to a V2X link, security techniques for PC5-RRC security may be applied for the signaling (e.g., PC5-S/PC5-RRC) and the PC5 bearer.

Figure 9:
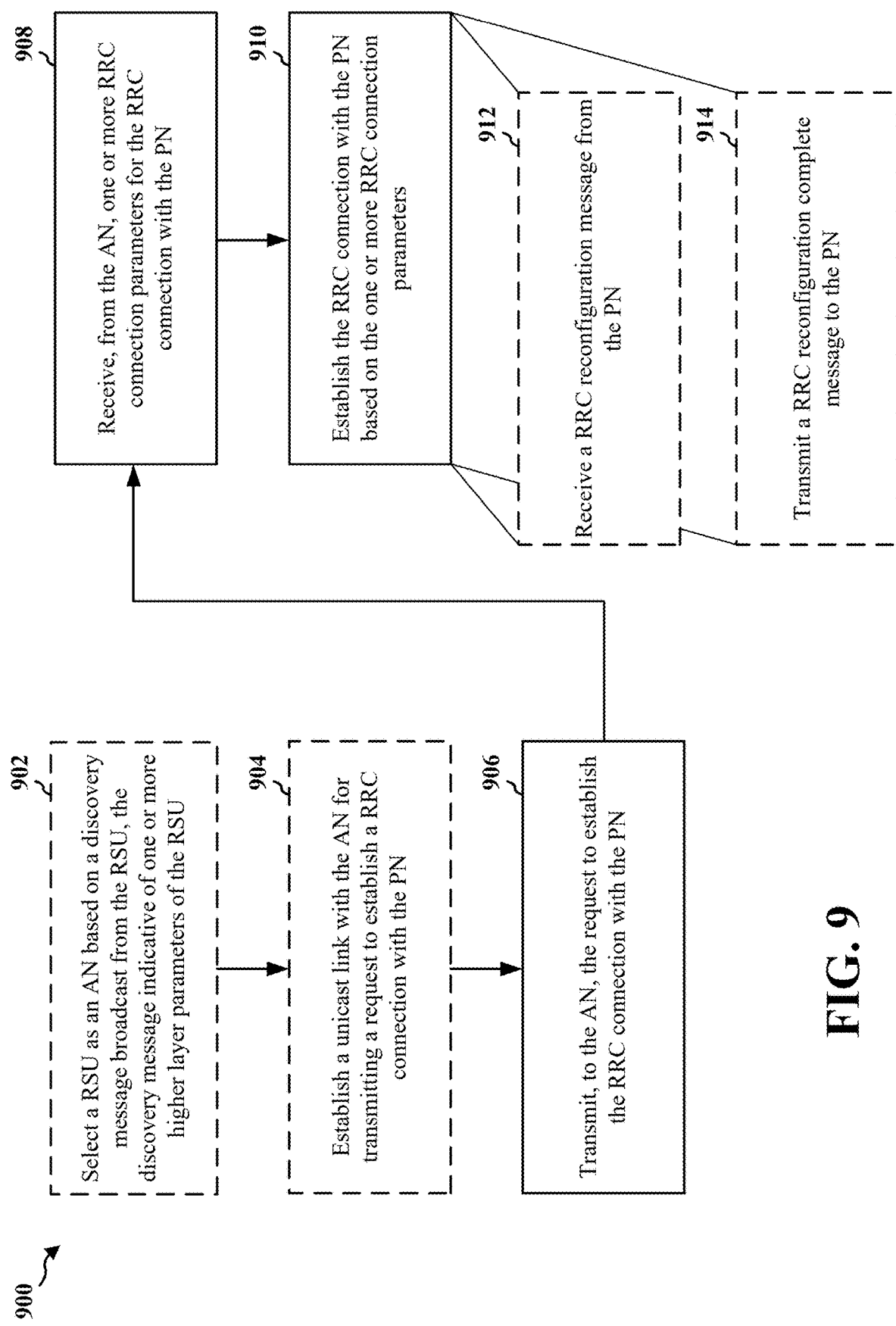
FIG. 9 is a flowchart of a method of wireless communication of a UE.

FIG. 9 is a flowchart 900 of a method of wireless communication. The method may be performed by a UE (e.g., the UE 104, 402, 502, 602, 702, 802; the apparatus 1202; etc.), which may include the memory 360 and which may be the entire UE 104, 402, 502, 602, 702, 802 or a component of the UE 104, 402, 502, 602, 702, 802, such as the TX processor 368, the RX processor 356, and/or the controller/processor 359.

At 902, the UE may select a RSU as an AN based on a discovery message broadcast from the RSU, the discovery message indicative of one or more higher layer parameters of the RSU. For example, referring to FIG. 4, the UE 402 may select, at 410, the AN 404 based on the discovery message broadcast, at 408, by the AN 404. The discovery message broadcast, at 408, may indicate higher layer parameter(s) of the AN 404. In examples, the AN may be at least one of a RSU, a Wi-Fi AP, or a base station.

At 904, the UE may establish a unicast link with the AN for transmitting a request to establish a RRC connection with the PN. For example, referring to FIG. 4, the UE 402 may establish, at 412, a unicast link with the AN 404 for transmitting, at 414a, the RRC connection request to the AN 404, which may be further transmitted, at 414b, to the PN 406 via the AN 404. The unicast link established, at 412, may be based on at least one of a PC5-S connection or a PC5-RRC connection.

At 906, the UE may transmit, to the AN, the request to establish the RRC connection with the PN. For example, referring to FIG. 4, the UE 402 may transmit, at 414a, the RRC connection request to the AN 404. The request (e.g., transmitted at 414a) to establish the RRC connection with the PN 406 may be based on at least one of a SRB mapping or a DRB mapping between the UE 402 and the PN 406.

The at least one of the SRB mapping or the DRB mapping may be associated with a bearer-based message (e.g., indicated, at 416). A security of the bearer-based message may be based on at least one of a dual connectivity security technique or a PC5-RRC security technique.

At 908, the UE may receive, from the AN, one or more RRC connection parameters for the RRC connection with the PN. For example, referring to FIG. 4, the UE 402 may receive, at 418b, RRC connection parameter(s) from the AN 404, which may have similarly received, at 418a, the RRC connection parameter(s) from the PN 406.

At 910, the UE may establish the RRC connection with the PN based on the one or more RRC connection parameters. For example, referring to FIGS. 4 and 7-8, the UE 402 may establish, at 420, a RRC connection with the PN 406 based on the RRC connection parameter(s) received, at 418b, from the AN 404. The RRC connection may be established, at 420, based on at least one of a RRC reconfiguration procedure (e.g., the reception, at 714/816, and the transmission, at 716/818) or a RACH procedure (e.g., at 718/820). In examples, the RRC connection established, at 420, may be based on at least one of an interface or an IP tunnel (e.g., the tunnels indicated via the diagrams 750 and 850) between at least one of the UE 702/802 and the PN 706/806 or the AN 704/804 and the PN 706/806.

At 912, to establish the RRC connection with the PN, the UE may receive a RRC reconfiguration message from the PN. For example, referring to FIGS. 7-8, the UE 702/802 may receive, at 714/816, a RRC reconfiguration message from the PN 706/806 over a PC5 link via the AN 704/804.

At 914, to establish the RRC connection with the PN, the UE may transmit a RRC reconfiguration complete message to the PN. For example, referring to FIGS. 7-8, the UE 702/802 may transmit, at 716/818, a RRC reconfiguration complete message to the PN 706/806 over a PC5 link via the AN 704/804.

Figure 10:
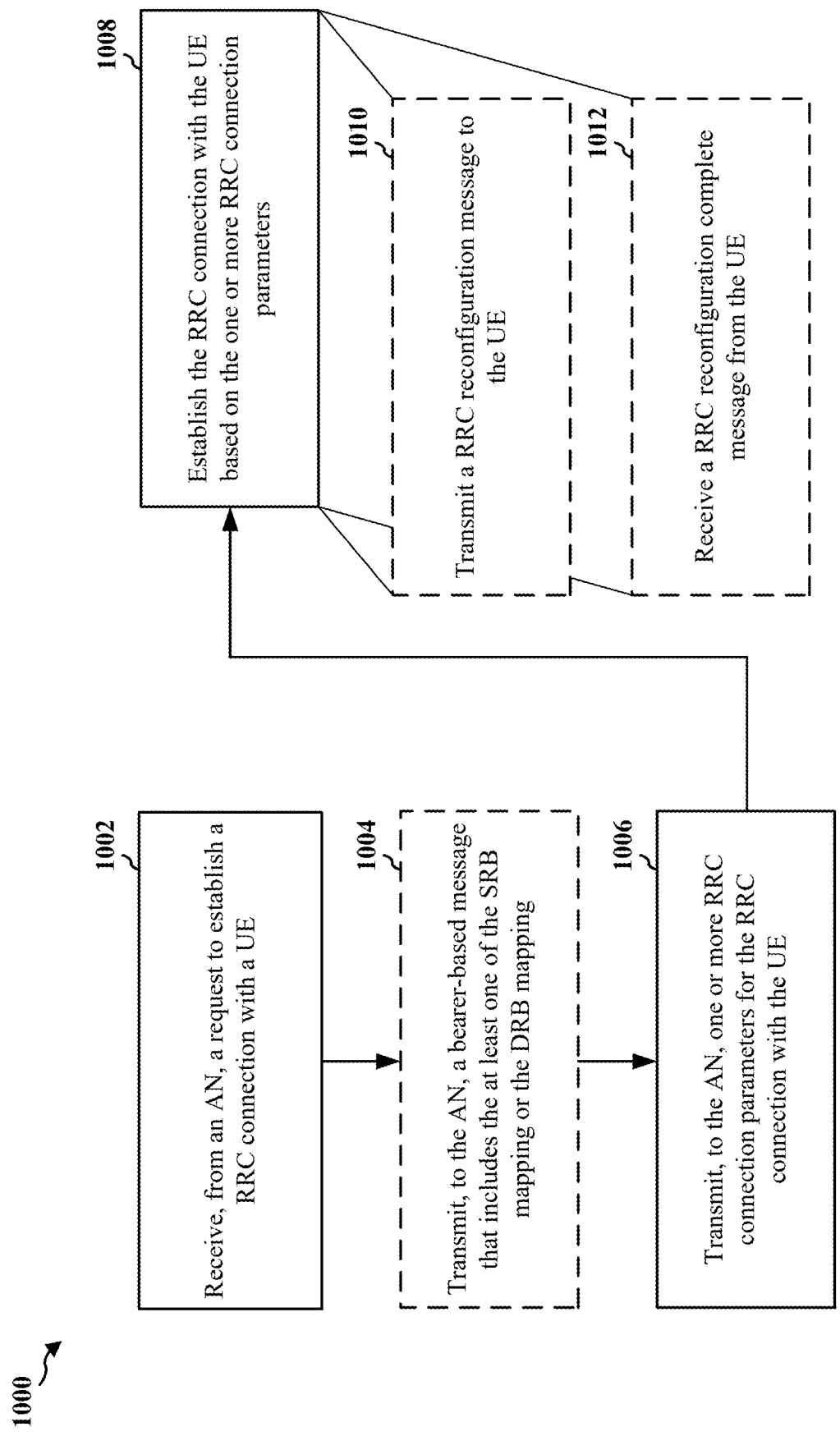
FIG. 10 is a flowchart of a method of wireless communication of a PN.

FIG. 10 is a flowchart 1000 of a method of wireless communication. The method may be performed by a PN, e.g., the PN 102, 406, 506, 604, 706, 806, which may include the memory 376 and which may be the entire PN 102, 406, 506, 604, 706, 806 or a component of the PN 102, 406, 506, 604, 706, 806, such as the TX processor 316, the RX processor 370, and/or the controller/processor 375.

At 1002, the PN may receive, from an AN, a request to establish a RRC connection with a UE. For example, referring to FIG. 4, the PN 406 may receive, at 414b, a RRC connection request from the AN 404, which may have been further received, at 414a, by the AN 404 from the UE 402. In examples, the AN 404 may be at least one of a RSU, a Wi-Fi AP, or a base station. The request (e.g., received at 414b) to establish the RRC connection with the UE 402 may be based on at least one of a SRB mapping or a DRB mapping between the UE 402 and the PN 406.

At 1004, the PN may transmit, to the AN, a bearer-based message that includes the at least one of the SRB mapping or the DRB mapping. For example, referring to FIG. 4, the PN 406 may transmit, at 416, to the AN 404, a bearer-based message indicative of the SRB/DRB mapping. A security of the bearer-based message (e.g., transmitted at 416) may be based on at least one of a dual connectivity security technique or a PC5-RRC security technique.

At 1006, the PN may transmit, to the AN, one or more RRC connection parameters for the RRC connection with the UE. For example, referring to FIG. 4, the PN 406 may transmit, at 418a, RRC connection parameter(s) to the AN 404, which may further transmit, at 418b, the RRC connection parameter(s) to the UE 402 for establishing, at 420, the RRC connection with the UE 402. In examples, the one or more RRC connection parameters may be transmitted, at 418a, to the AN 404 via a PC5 unicast link.

At 1008, the PN may establish the RRC connection with the UE based on the one or more RRC connection parameters. For example, referring to FIGS. 4 and 7-8, the PN 406 may establish, at 420, the RRC connection with the UE 402 based on the RRC connection parameter(s) transmitted, at 418a. The RRC connection may be established, at 420, based on at least one of a RRC reconfiguration procedure (e.g., the transmission, at 714/816, and the reception, at 716/818) or a RACH procedure (e.g., at 718/820). In examples, the RRC connection established, at 420, may be based on at least one of an interface or an IP tunnel (e.g., the tunnels indicated via the diagrams 750 and 850) between at least one of the PN 706/806 and the UE 702/802 or the PN 706/806 and the AN 704/804.

At 1010, the PN may transmit a RRC reconfiguration message to the UE. For example, referring to FIGS. 7-8, the PN 706/806 may transmit, at 714/816, a RRC reconfiguration message to the UE 702/802 over a PC5 link via the AN 704/804.

At 1012, the PN may receive a RRC reconfiguration complete message from the UE. For example, referring to FIG. 7-8, the PN 706/806 may receive, at 716/818, a RRC reconfiguration complete message from the UE 702/802 over a PC5 link via the AN 704/804.

Figure 11:
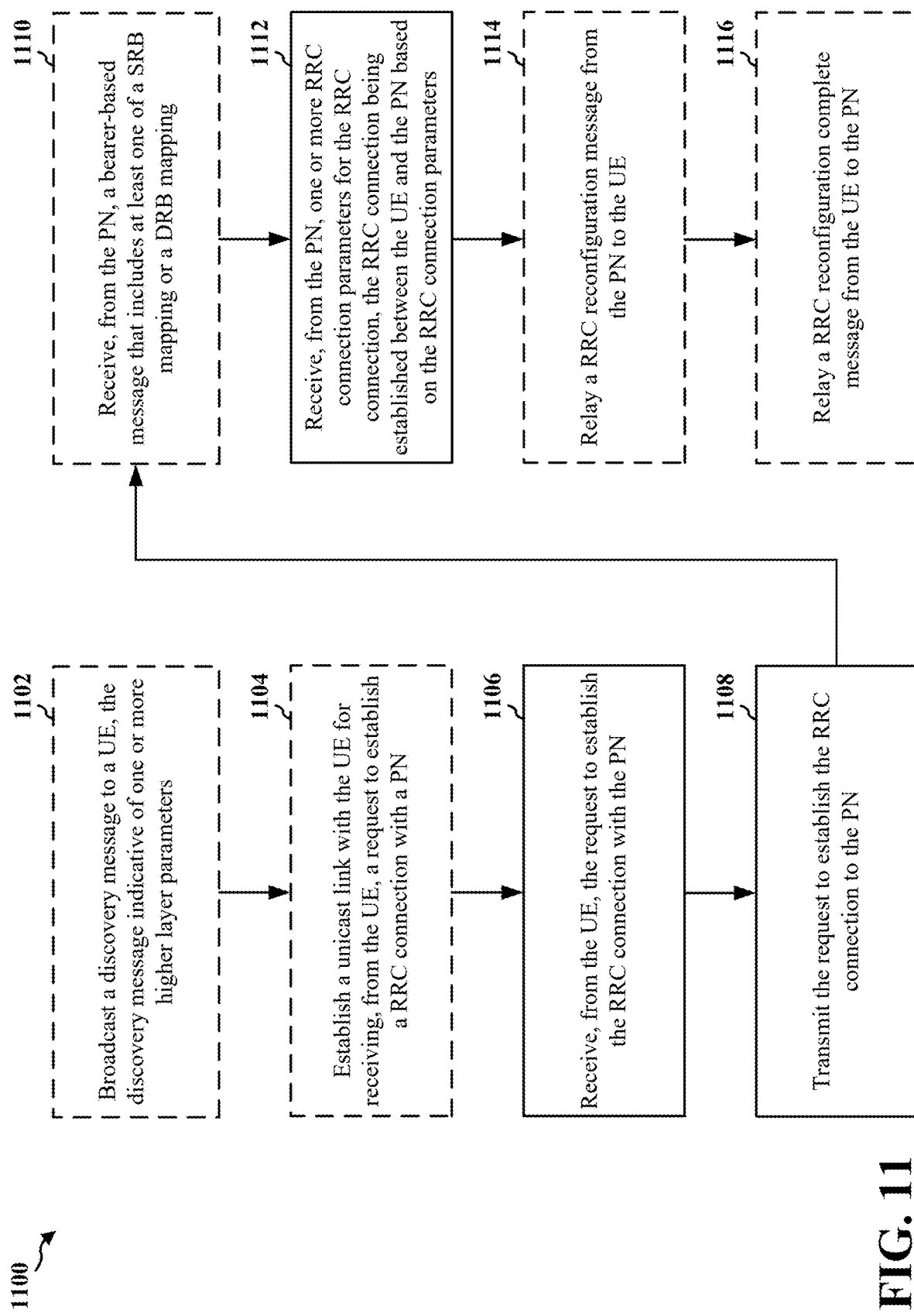
FIG. 11 is a flowchart of a method of wireless communication of an AN.

FIG. 11 is a flowchart 1100 of a method of wireless communication. The method may be performed by an AN, e.g., the AN 180, 404, 504, 606, 704, 804, which may include the memory 376 and which may be the entire AN 180, 404, 504, 606, 704, 804 or a component of the AN 180, 404, 504, 606, 704, 804, such as the TX processor 316, the RX processor 370, and/or the controller/processor 375. In examples, the AN may be at least one of a RSU, a Wi-Fi AP, or a base station.

At 1102, the AN may broadcast a discovery message to a UE, the discovery message indicative of one or more higher layer parameters. For example, referring to FIG. 4, the AN 404 may broadcast, at 408, a discovery message indicative of higher layer parameter(s).

At 1104, the AN may establish a unicast link with the UE for receiving, from the UE, a request to establish a RRC connection with a PN. For example, referring to FIG. 4, the AN 404 may establish, at 412, a unicast link with the UE 402, such that the AN 404 may receive, at 414a, the RRC connection request via the unicast link. In examples, the unicast link may be based on at least one of a PC5-S connection or a PC5-RRC connection.

At 1106, the AN may receive, from the UE, the request to establish the RRC connection with the PN. For example, referring to FIG. 4, the AN 404 may receive, at 414a, the RRC connection request from the UE 402. The request (e.g., received at 414a) to establish the RRC connection with the PN 406 may be based on at least one of a SRB mapping or a DRB mapping between the UE 402 and the PN 406.

At 1108, the AN may transmit the request to establish the RRC connection to the PN. For example, referring to FIG. 4, the AN 404 may transmit, at 414b, the RRC connection request to the PN 406.

At 1110, the AN may receive, from the PN, a bearer-based message that includes at least one of a SRB mapping or a DRB mapping. For example, referring to FIG. 4, the AN 404 may receive, at 416, a bearer-based message indicative of a SRB/DRB mapping. A security of the bearer-based message (e.g., received at 416) may be based on at least one of a dual connectivity security technique or a PC5-RRC security technique.

At 1112, the AN may receive, from the PN, one or more RRC connection parameters for the RRC connection, the RRC connection being established between the UE and the PN based on the RRC connection parameters. For example, referring to FIG. 4, the AN 404 may receive, at 418a, RRC connection parameter(s) from the PN 406 for the UE 402 and the PN 406 to establish, at 420, the RRC connection between the UE 402 and the PN 406.

At 1114, the AN may relay a RRC reconfiguration message from the PN to the UE, where the RRC connection between the UE and the PN is established based on the relaying of the RRC reconfiguration message. For example, referring to FIGS. 4 and 7-8, the AN 704/804 may relay, at 714/816, a RRCReconfiguration message from the PN 706/806 to the UE 702/802, such that the RRC connection may be established, at 420, based on the relay, at 714/816, of the RRCReconfiguration message.

At 1116, the AN may relay a RRC reconfiguration complete message from the UE to the PN, where the RRC connection between the UE and the PN is established based on the relaying of the RRC reconfiguration complete message. For example, referring to FIGS. 4 and 7-8, the AN 704/804 may relay, at 716/818, a RRCReconfigurationComplete message from the UE 702/802 to the PN 706/806, such that the RRC connection may be established, at 420, based on the relay, at 716/818, of the RRCReconfigurationComplete message.

Figure 12:
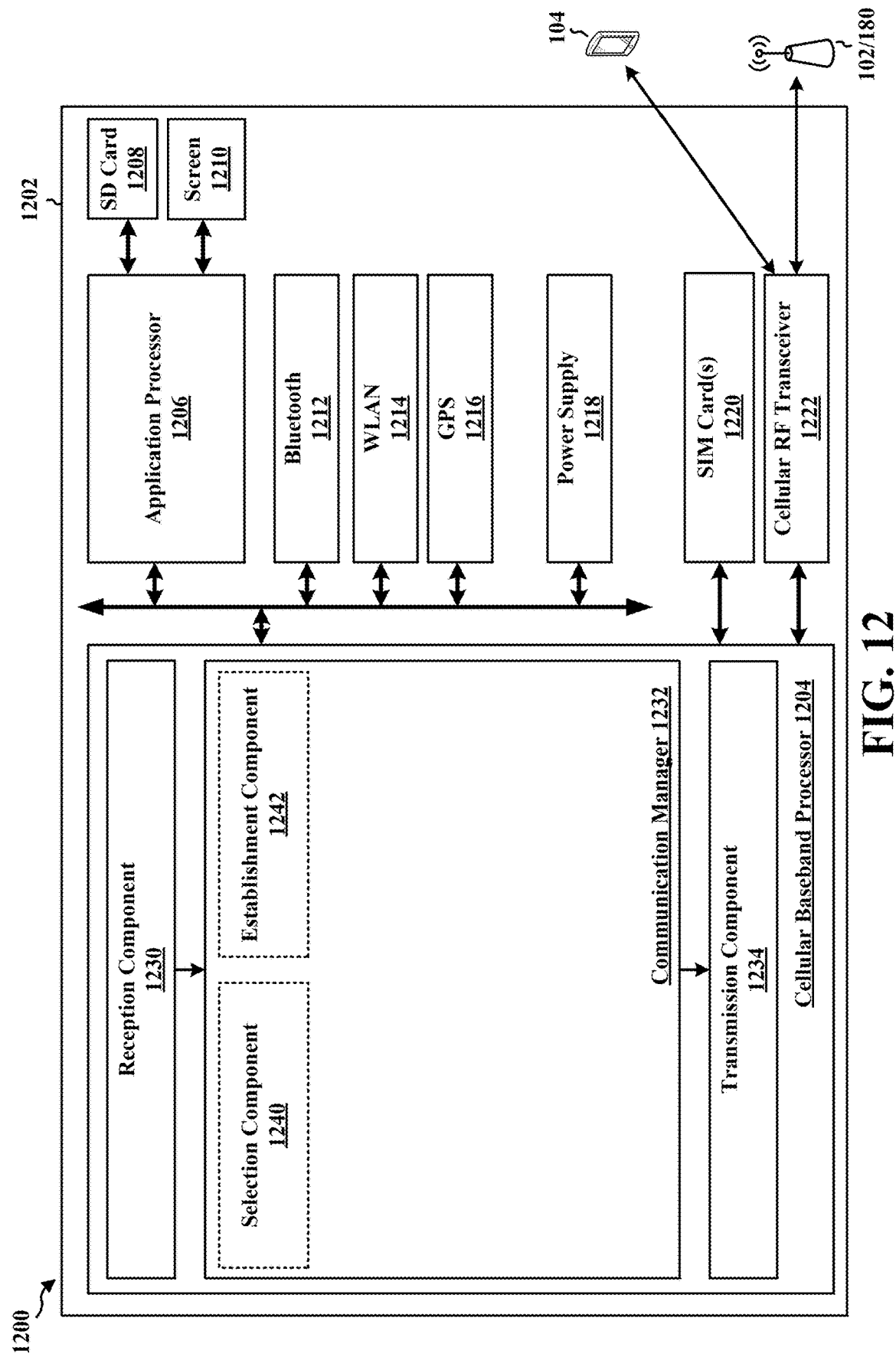
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The reception component 1230 is configured, e.g., in connection with 908 and 912, to receive, from the AN, one or more RRC connection parameters for the RRC connection with the PN; and to receive a RRC reconfiguration message from the PN. The communication manager 1232 includes a selection component 1240 that is configured, e.g., as described in connection with 902, to select a RSU as an AN based on a discovery message broadcast from the RSU, the discovery message indicative of one or more higher layer parameters of the RSU. The communication manager 1232 further includes an establishment component 1242 that is configured, e.g., as described in connection with 904 and 910, to establish a unicast link with the AN for transmitting a request to establish a RRC connection with the PN; and to establish the RRC connection with the PN based on the one or more RRC connection parameters. The transmission component 1234 is configured, e.g., as described in connection with 906 and 914, to transmit, to the AN, the request to establish the RRC connection with the PN; and to transmit a RRC reconfiguration complete message to the PN.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting, to an AN, a request to establish a RRC connection with a PN; means for receiving, from the AN, one or more RRC connection parameters for the RRC connection with the PN; and means for establishing the RRC connection with the PN based on the one or more RRC connection parameters. The apparatus 1202 further includes means for selecting the RSU as the AN based on a discovery message broadcast from the RSU, the discovery message indicative of one or more higher layer parameters of the RSU. The apparatus 1202 further includes means for establishing a unicast link with the AN to transmit the request to establish the RRC connection with the PN. In examples, the means for establishing the RRC connection with the PN is further configured to receive a RRC reconfiguration message from the PN; and transmit a RRC reconfiguration complete message to the PN. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
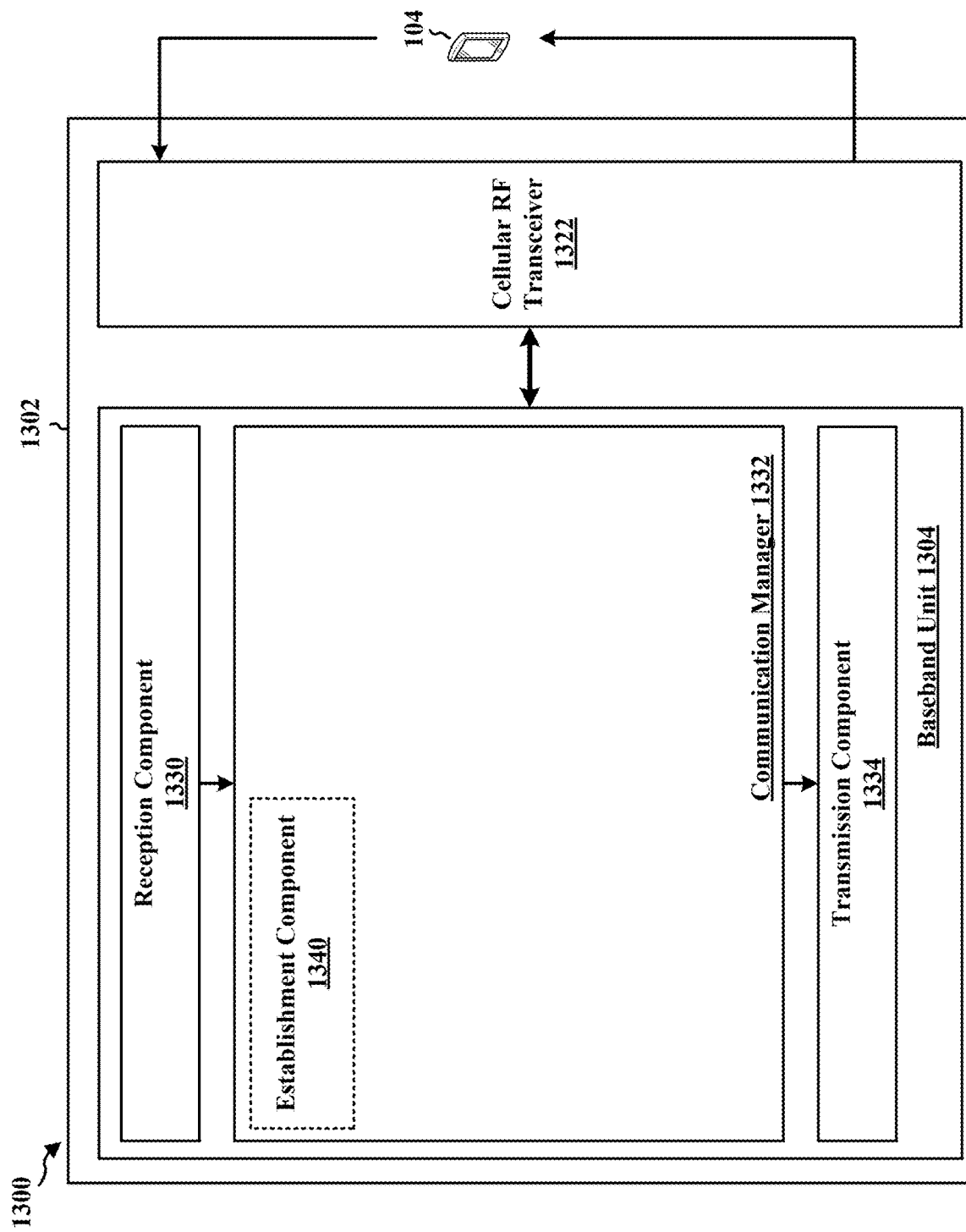
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The reception component 1330 is configured, e.g., as described in connection with 1002 and 1012, to receive, from an AN, a request to establish a RRC connection with a UE; and to receive a RRC reconfiguration complete message from the UE. The communication manager 1332 includes an establishment component 1340 that is configured, e.g., as described in connection with 1008, to establish the RRC connection with the UE based on the one or more RRC connection parameters. The transmission component 1334 is configured, e.g., as described in connection with 1004, 1006, and 1010, to transmit, to the AN, a bearer-based message that includes the at least one of the SRB mapping or the DRB mapping; to transmit, to the AN, one or more RRC connection parameters for the RRC connection with the UE; and to transmit a RRC reconfiguration message to the UE.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving, from an AN, a request to establish a RRC connection with a UE; means for transmitting, to the AN, one or more RRC connection parameters for the RRC connection with the UE; and means for establishing the RRC connection with the UE based on the one or more RRC connection parameters. In examples, the means for establishing the RRC connection with the UE is further configured to transmit a RRC reconfiguration message to the UE; and receive a RRC reconfiguration complete message from the UE. The apparatus 1302 further includes means for transmitting, to the AN, a bearer-based message that includes the at least one of the SRB mapping or the DRB mapping. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
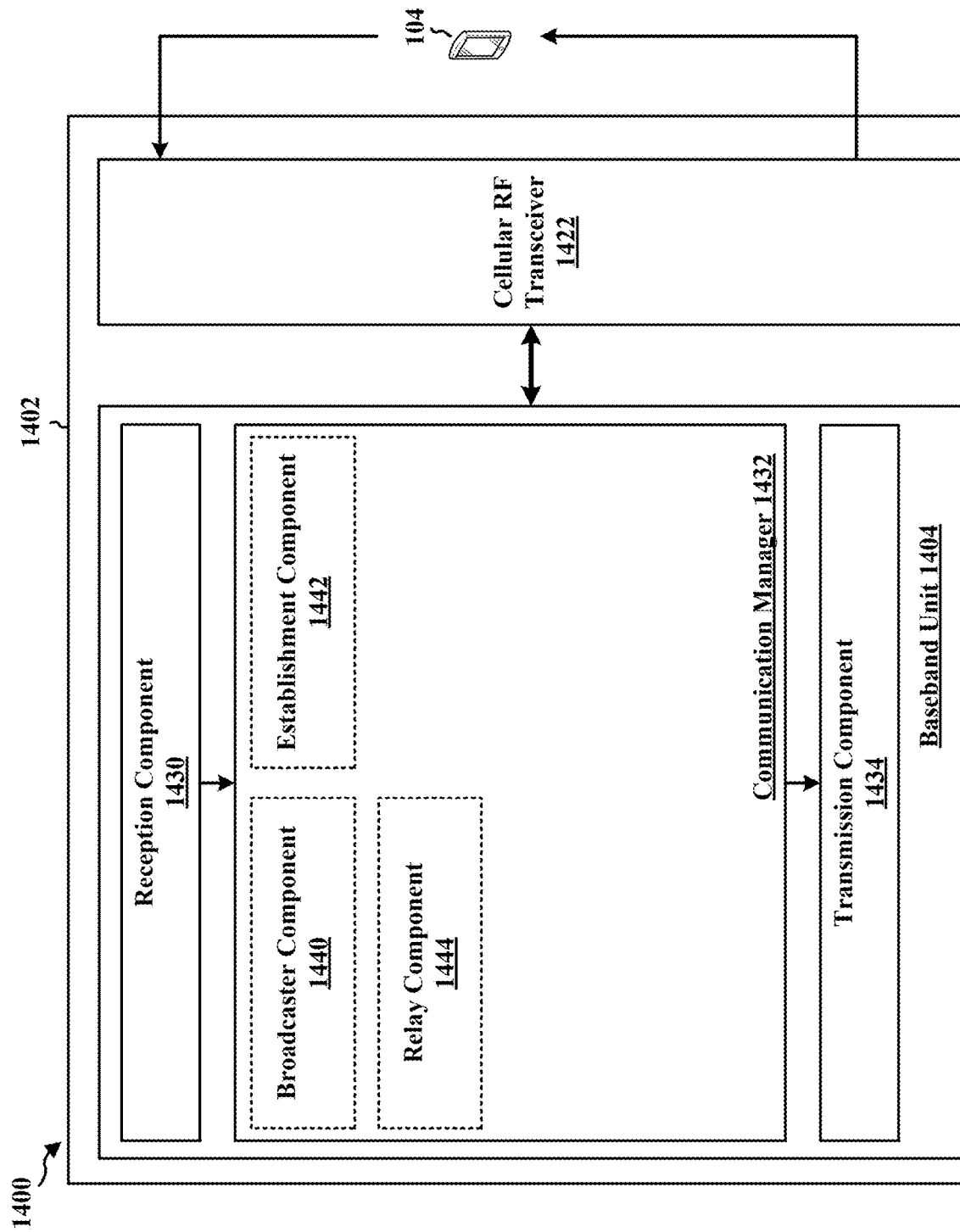
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The reception component 1430 is configured, e.g., as described in connection with 1106, 110, and 1112, to receive, from the UE, the request to establish the RRC connection with the PN; to receive, from the PN, a bearer-based message that includes at least one of a SRB mapping or a DRB mapping; and to receive, from the PN, one or more RRC connection parameters for the RRC connection, the RRC connection being established between the UE and the PN based on the RRC connection parameters. The communication manager 1432 includes a broadcaster component 1440 that is configured, e.g., as described in connection with 1102, to broadcast a discovery message to a UE, the discovery message indicative of one or more higher layer parameters. The communication manager 1432 further includes an establishment component 1442 that is configured, e.g., as described in connection with 1104, to establish a unicast link with the UE for receiving, from the UE, a request to establish a RRC connection with a PN. The communication manager 1432 further includes a relay component 1444 that is configured, e.g., as described in connection with 1114 and 1116, to relay a RRC reconfiguration message from the PN to the UE; and to relay a RRC reconfiguration complete message from the UE to the PN. The transmission component 1434 is configured, e.g., as described in connection with 1108, to transmit the request to establish the RRC connection to the PN.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving, from a UE, a request to establish a RRC connection with a PN; means for transmitting the request to establish the RRC connection to the PN; and means for receiving, from the PN, one or more RRC connection parameters for the RRC connection, the RRC connection being established between the UE and the PN based on the RRC connection parameters. The apparatus 1402 further includes means for broadcasting a discovery message to the UE, the discovery message indicative of one or more higher layer parameters. The apparatus 1402 further includes means for establishing a unicast link with the UE, the request to establish the RRC connection with the PN being received from the UE via the unicast link. The apparatus 1402 further includes means for receiving, from the PN, a bearer-based message that includes the at least one of the SRB mapping or the DRB mapping. The apparatus 1402 further includes means for relaying a RRC reconfiguration message from the PN to the UE; and means for relaying a RRC reconfiguration complete message from the UE to the PN, where the RRC connection between the UE and the PN is established based on the relaying of the RRC reconfiguration message and the relaying of the RRC reconfiguration complete message. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A user equipment (UE), comprising:
   at least one memory comprising instructions;
   at least one transceiver; and
   at least one processor configured to execute the instructions to cause the UE to:
      transmit, via the at least one transceiver and to an assistant node (AN) via a non-UE-Universal Mobile Telecommunications System (UMTS) terrestrial radio access network (UTRAN) (Uu) (non-Uu) link, a request to establish a radio resource control (RRC) connection with a primary node (PN);
      receive, via the at least one transceiver and from the AN via the non-Uu link, one or more RRC connection parameters for the RRC connection with the PN; and
      establish, via the at least one transceiver, the RRC connection with the PN via a Uu link based on the one or more RRC connection parameters.

2. The UE of claim 1, wherein the AN is one of a roadside unit (RSU), a Wi-Fi access point (AP), or a base station.

3. The UE of claim 2, wherein the at least one processor is further configured to cause the UE to select the RSU as the AN based on a discovery message broadcast from the RSU, the discovery message indicative of one or more higher layer parameters of the RSU.

4. The UE of claim 1, wherein the at least one processor is further configured to cause the UE to establish a unicast link with the AN to transmit the request to establish the RRC connection with the PN.

5. The UE of claim 1, wherein the request to establish the RRC connection with the PN is based on at least one of a signaling radio bearer (SRB) mapping between the UE and the PN or a dedicated radio bearer (DRB) mapping between the UE and the PN.

6. The UE of claim 5, wherein the at least one of the SRB mapping or the DRB mapping includes a bearer-based message.

7. The UE of claim 6, wherein a security of the bearer-based message is based on at least one of a dual connectivity security technique or a PC5-RRC security technique.

8. The UE of claim 1, wherein the RRC connection is associated with at least one of a RRC reconfiguration procedure or a random access channel (RACH) procedure.

9. The UE of claim 1, wherein to establish, via the at least one transceiver, the RRC connection with the PN, the at least one processor is configured to cause the UE to:
   receive, via the at least one transceiver, a RRC reconfiguration message from the PN; and
   transmit, via the at least one transceiver, a RRC reconfiguration complete message to the PN.

10. The UE of claim 1, wherein the RRC connection is based on at least one of an interface or an internet protocol (IP) tunnel between at least one of the UE and the PN or the AN and the PN.

11. A primary node (PN), comprising:
    at least one memory comprising instructions;
    at least one transceiver; and
    at least one processor configured to execute the instructions to cause the PN to:
       receive, via the at least one transceiver and from an assistant node (AN), a request to establish a radio resource control (RRC) connection with a user equipment (UE);
       transmit, via the at least one transceiver and to the AN, one or more RRC connection parameters for the RRC connection with the UE, wherein the one or more RRC connection parameters are configured to be forwarded to the UE via a non-UE-Universal Mobile Telecommunications System (UMTS) terrestrial radio access network (UTRAN) (Uu) (non-Uu) link between the UE and the AN; and
       establish, via the at least one transceiver, the RRC connection with the UE via a Uu link based on the one or more RRC connection parameters.

12. The PN of claim 11, wherein the AN is one of a roadside unit (RSU), a Wi-Fi access point (AP), or a base station.

13. The PN of claim 11, wherein the request to establish the RRC connection with the UE is based on at least one of a signaling radio bearer (SRB) mapping between the UE and the PN or a dedicated radio bearer (DRB) mapping between the UE and the PN.

14. The PN of claim 13, wherein the at least one processor is further configured to cause the PN to transmit, via the at least one transceiver and to the AN, a bearer-based message that includes the at least one of the SRB mapping or the DRB mapping.

15. The PN of claim 14, wherein a security of the bearer-based message is based on at least one of a dual connectivity security technique or a PC5-RRC security technique.

16. The PN of claim 11, wherein the RRC connection is associated with at least one of a RRC reconfiguration procedure or a random access channel (RACH) procedure.

17. The PN of claim 11, wherein to establish, via the at least one transceiver, the RRC connection with the UE, the at least one processor is configured to cause the PN to:
transmit, via the at least one transceiver, a RRC reconfiguration message to the UE; and
receive, via the at least one transceiver, a RRC reconfiguration complete message from the UE.

18. The PN of claim 11, wherein the RRC connection is based on at least one of an interface or an internet protocol (IP) tunnel between at least one of the PN and the UE or the PN and the AN.

19. An access node (AN), comprising:
at least one memory comprising instructions;
at least one transceiver, and
at least one processor configured to execute the instructions to cause the AN to:
receive, via the at least one transceiver and from a user equipment (UE) via a non-UE-Universal Mobile Telecommunications System (UMTS) terrestrial radio access network (UTRAN) (Uu) (non-Uu) link, a request to establish a radio resource control (RRC) connection with a primary node (PN);
transmit, via the at least one transceiver, the request to establish the RRC connection to the PN; and
receive, via the at least one transceiver and from the PN, one or more RRC connection parameters for the RRC connection, the RRC connection being based on the RRC connection parameters and being based on a Uu link.

20. The AN of claim 1, wherein the AN is one of a roadside unit (RSU), a Wi-Fi access point (AP), or a base station.

21. The AN of claim 1, wherein the at least one processor is further configured to cause the AN to broadcast a discovery message to the UE, the discovery message indicative of one or more higher layer parameters.

22. The AN of claim 19, wherein the at least one processor is further configured to cause the AN to establish a unicast link with the UE, and wherein to receive, via the at least one transceiver, the request to establish the RRC connection with the PN, the at least one processor is configured to cause the AN to receive, via the at least one transceiver, the request to establish the RRC connection with the PN from the UE via the unicast link.

23. The AN of claim 19, wherein the request to establish the RRC connection with the PN is based on at least one of a signaling radio bearer (SRB) mapping between the UE and the PN or a dedicated radio bearer (DRB) mapping between the UE and the PN.

24. The AN of claim 23, wherein the at least one processor is further configured to receive, via the at least one transceiver and from the PN, a bearer-based message that includes the at least one of the SRB mapping or the DRB mapping.

25. The AN of claim 24, wherein a security of the bearer-based message is based on at least one of a dual connectivity security technique or a PC5-RRC security technique.

26. The AN of claim 19, wherein the at least one processor is further configured to cause the AN to:
relay a RRC reconfiguration message from the PN to the UE; and
relay a RRC reconfiguration complete message from the UE to the PN, wherein the RRC connection between the UE and the PN is based on the relaying of the RRC reconfiguration message and the relaying of the RRC reconfiguration complete message.

* * * * *